US00RE44382E

(19) United States
(12) Reissued Patent
Kim

(10) Patent Number: US RE44,382 E
(45) Date of Reissued Patent: Jul. 16, 2013

(54) CHARACTER DISPLAY APPARATUS AND METHOD FOR A DIGITAL VERSATILE DISC

(75) Inventor: Young-Chul Kim, Seoul (KR)

(73) Assignee: LG Electronics Inc., Seoul (KR)

(21) Appl. No.: 11/330,424

(22) Filed: Jan. 12, 2006

Related U.S. Patent Documents

Reissue of:
(64) Patent No.: 6,253,221
Issued: Jun. 26, 2001
Appl. No.: 08/878,600
Filed: Jun. 19, 1997

U.S. Applications:
(63) Continuation of application No. 10/606,362, filed on Jun. 26, 2003, now Pat. No. Re. 42,441.

(30) Foreign Application Priority Data

Jun. 21, 1996 (KR) ..... 96 22891

(51) Int. Cl.
*G06F 7/00* (2006.01)

(52) U.S. Cl.
USPC ..... 707/756; 345/467

(58) Field of Classification Search
USPC ..... 707/526, 536, 101, 100, 104.1, 756, 707/999.1, 999.101; 345/467, 471; 386/97; 348/563, 564, 589, 600
See application file for complete search history.

(56) References Cited

U.S. PATENT DOCUMENTS 4,079,458 A * 3/1978 Rider et al. ..... 345/471
5,010,417 A 4/1991 Yoshio et al.

(Continued)

FOREIGN PATENT DOCUMENTS

KR 96-700510 A 5/1995

OTHER PUBLICATIONS

Intermedia World, '96 showcases future home theater experience through the introduction of digital video discs (DVD), PR Newswire, pp. 1-2, Feb. 1996.*

*Primary Examiner* — Tony Mahmoudi
*Assistant Examiner* — Michael Le
(74) *Attorney, Agent, or Firm* — Birch, Stewart, Kolasch & Birch, LLP

(57) ABSTRACT

[This invention relates to a character display apparatus and method for a DVD (Digital Versatile Disc) player. According to the present invention, it is provided that font data of at least some of multi-languages to be used in multilingual subtitle processing are recorded on certain area(s) of a DVD, the recorded font data are stored in a font memory at initial stage of playback, the stored font data corresponding to a language selected by selection input of a user are then read, characters for subtitle processing of the selected language are displayed. Therefore, the manufacturing cost of DVD players can be reduced due to the reduction of memory capacity requied and DVDs can be maximum efficiently utilized.] *A character display method including receiving into a character displaying device a first font data, the first font data for displaying character data, storing, in a first memory area, the received first font data; storing, in a second memory area, a second font data that is different than the first font data stored in the first memory area; and displaying the character data to have a font defined by at least one of the first font data stored in the first memory area and the second font data stored in the second memory area.*

20 Claims, 3 Drawing Sheets

U.S. PATENT DOCUMENTS 5,233,333 A 8/1993 Borsuk
5,251,293 A * 10/1993 Ishii et al. ..... 715/542
5,280,572 A * 1/1994 Case et al. ..... 369/47.16
5,521,613 A * 5/1996 Hayashi ..... 345/563
5,541,663 A 7/1996 Ohno
5,652,824 A * 7/1997 Hirayama et al. ..... 386/244
5,712,663 A 1/1998 Matsumoto
5,721,720 A 2/1998 Kikuchi et al.
5,731,847 A * 3/1998 Tsukagoshi ..... 348/589
5,767,845 A 6/1998 Oashi et al.
5,805,153 A 9/1998 Nielsen
6,020,982 A 2/2000 Yamauchi et al.
6,128,434 A * 10/2000 Hirayama et al. ..... 386/97
6,130,722 A * 10/2000 Bae et al. ..... 348/589
6,144,414 A * 11/2000 Toba ..... 348/564
6,208,383 B1 * 3/2001 Park ..... 348/468
2004/0081434 A1 * 4/2004 Jung et al. ..... 386/95

* cited by examiner

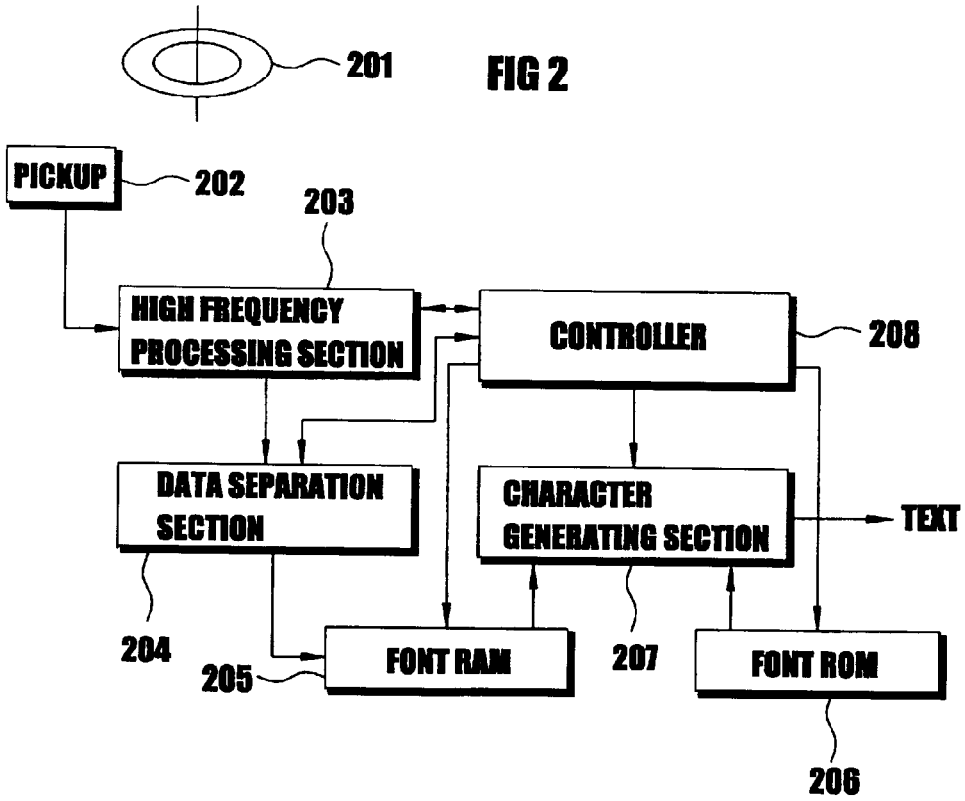
FIG 2
FIG 3
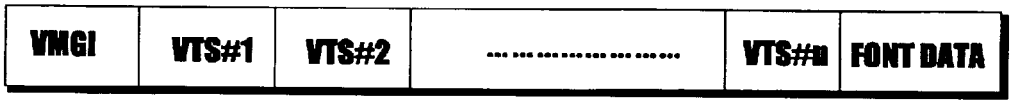

CHARACTER DISPLAY APPARATUS AND METHOD FOR A DIGITAL VERSATILE DISC

Matter enclosed in heavy brackets [ ] appears in the original patent but forms no part of this reissue specification; matter printed in italics indicates the additions made by reissue.

*RELATED APPLICATION*

*The present application is a continuation application of Reissue application Ser. No. 10/606,362 filed on Jun. 26, 2003, which is a reissue of application Ser. No. 08/878,600 filed Jun. 19, 1997, now issued as U.S. Pat. No. 6,253,221 on Jun. 26, 2001. The entire contents of each of these applications are fully incorporated by reference.*

BACKGROUND OF THE INVENTION

1. Field of the Invention

The present invention relates to character display for a digital versatile disc (DVD) player and particularly to a character display apparatus and method for a DVD player using font data recorded on a disc.

2. Description of the Prior Art

FIG. 1 is a block diagram of a conventional character display system for a DVD player. As shown in FIG. 1, *the* conventional character display system is provided with a pickup 102 for detecting data recorded on a disc 101, a high frequency processing section 103 for processing the detected data of the pickup 102 and outputting video *and/or audio* signals, a font ROM 104 for storing font data corresponding to multi-languages, a character generation section 105 for receiving the font data stored in the font ROM 104 and generating character signals of characters for subtitle processing a language selected by a user, and a controller 106 for controlling the high frequency processing section 103, the font ROM 104 and the character generation section 105.

The operation of the conventional character display system will be described hereinafter.

First, when a disc is inserted in a DVD player thereby initiating a playback, the pickup 102 detects data recorded on the disc and outputs them to the high frequency processing section 103.

Accordingly, the high frequency processing section 103 processes the detected data of the pickup 102 and outputs video signals thereby displaying images on a screen.

At this time, if the user inputs a language selection key signal (not shown), the controller 106 recognizes it and controls the character generation section 105.

Thus, the character generation section 105 reads the font data of the language selected by the user among the font data of the multi-languages stored in the font ROM 104 for multilingual character subtitle processing and outputs the corresponding character signals.

However, conventionally, font data of all the multi-languages had to be stored in the DVD player, if multilingual character subtitle processing is needed (for example, 32 languages in standard for DVD players). As a result, ROM (s) having larger memory capacity must be used thereby increasing the cost of manufacturing DVD players.

SUMMARY OF THE INVENTION

To solve the above problem with the conventional character display system, an object of the present invention is to provide a character display apparatus for a DVD player which is capable of reducing the memory capacity neeeded for multilingual character subtitle processing.

Another object of the present invention is to provide a character display method for a DVD player which is capable of reducing the memory capacity necessary for multilingual character subtitle processing.

Yet another object of the present invention is to provide a DVD that is used in the character display apparatus and method to reduce the memory capacity needed in the player.

Still another object of the present invention is to maximize the efficiency of use of a DVD.

To accomplish the above objects, one aspect of the present invention is to provide a character display apparatus for a DVD player which outputs character signals of a language selected from multi-languages to be used in the multilingual character subtiltle processing, on the basis of font data at least some of which are recorded in a DVD.

The character display apparatus may comprise a detection and separation means for detecting the recorded data including the font data from the DVD, and for separating the font data from the detected data; a first memory means for storing font data output from the detection and separation means; a character generation means for outputting the character signals of the selected language for subtitle processing by using the font data stored in the first memory means; and a control means for controlling the detection and separation means, the first memory means and the character generation means.

Further, the detection and separation means may comprise a pickup means for detecting the recorded data including the font data from the DVD, and for outputting the detected data; a high frequency processing means for processing detected data output from the pickup means, and for outputting video *and/or audio* data signals; and a data separation means for separating the font data from the output signals of the high frequency processing means, and for outputting the separated font data. The control means may control the high frequency processing means, the data separation means, the first memory means and the character generation means.

The character display apparatus may, in addition, comprises a second memory for storing font data of some of the multi-languages. The control means may control the character generation means to output character signals of the selected language for subtitle processing by using the font data of the selected language from the second memory if the font data of the selected language is not on the DVD.

According to one aspect of a character display method for a DVD player of this invention, character signals of a language selected from multi-languages to be used in the multilingual character subtitle processing on the basis of font data at least some of which are recorded in a DVD are output for subtitle processing.

The character display method may comprise steps of: detecting the recorded data including the font data from the DVD, and separating the font data from the detected data; storing the separated font data output from detecting and separating step in a first memory means; and outputting the character signals of the selected language for subtitle processing by using the font data stored in the first memory means.

Further, the detecting and separating step may comprise the substeps of detecting and outputting the recorded data including the font data from the DVD; processing the recorded data output from the detecting and outputting substep, and outputting video data signals; and separating the font data from the video data signals, and for outputting the separated font data.

Further, the player may further comprise a second memory for storing font data of some of the multi-languages, and in the step of outputting the character signals of the selected language for subtitle processing, the character signals of the selected language may be output by using the font data of the selected language stored in the second memory if the character signals of the selected language for subtitle processing are not on the DVD.

According to another aspect of the character display method for a DVD player of this invention, the method comprises a first step for determining whether font data of at least some of multi-languages to be used in multilingual subtitle processing are recorded in a DVD if the DVD is inserted in the player; a second step for storing font data of at least some of the recorded languages in a first memory, if the font data of characters of languages related to the multilingual subtitle processing are stored in the DVD; and a third step for outputting character signals of a selected language for subtitle processing according to the font data stored in the first memory when one of the multi-languages is selected.

In the above, the player may further comprise a second memory for storing font data of some of the multi-languages, and the character signals of the selected language for subtitle processing in the third step may be output by using the font data of the selected language from the second memory if the character signals of the selected language for subtitle processing are not recorded on the DVD.

Further, the present invention provides a DVD on which font data of at least some of multi-languages to be used in the multilingual subtitle processing are recorded.

Generally, it is possible for a DVD player to subtitle-process 32 languages according to its standard. Thus font data of each of the above exemplified 32 languages are needed for selective subtitle processing of the 32 languages. However, according to the abovementioned construction of the present invention, the relevant characters of a selected language are displayed by reading out font data of the selected language when character display is selected after font data of at least some of 32 languages recorded on a predetermined area of the DVD have been downloaded, and stored into a RAM(s) at the beginning of a playback.

Namely, the present invention may exclude font data of at least some of the languages among the multi-languages from the font ROM. For example, on the basis of recorded contents of a disc, font data of languages with less chance to be selected by users can be recorded on a disc through discussion with manufacturers. Therefore the capacity of the font ROM may be reduced ralative to the conventional character display system where all of the font data of 32 languages must be recorded on the font ROM.

Other and further objects, features and advantages of the invention will be apparent from the following description.

BRIEF DESCRIPTION OF THE DRAWINGS

A detailed description of this invention will be given with reference to the accompanying drawings.

FIG. 2 is a block diagram of an embodiment of the character display apparatus for a DVD player according to the present invention.

FIG. 3 is an illustration of a recording format of a disc.

DESCRIPTION OF THE PREFERRED EMBODIMENTS

Figure 1:
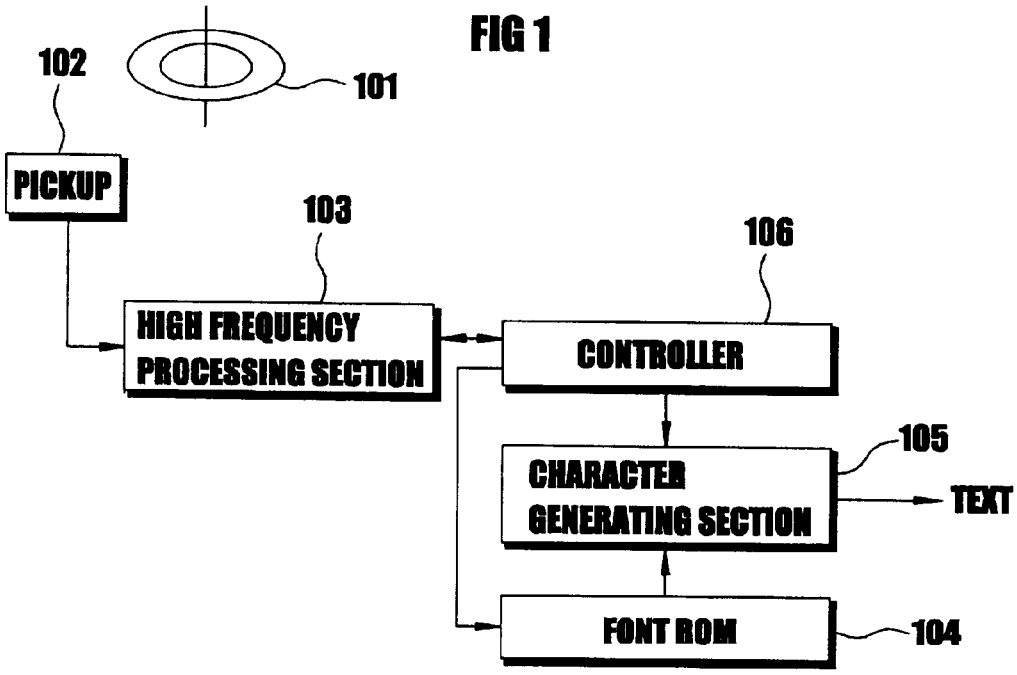
FIG. 1 is a block diagram of a conventional character display system for a DVD player.

FIG. 2 is a block diagram of an embodiment of the character display apparatus for a DVD player according to the present invention As shown, the character display apparatus for a DVD player according to the embodiment of the present invention is provided with a pickup 202 which detects recorded data including font data of at least some of multi-languages to be used in multilingual subtitle processing from a disc 201; a high frequency processing section 203 for processing output signals of the pickup 202 and outputting video data signals; a data separation section 204 for separating the font data from output signals of the high frequency processing section 203; a font RAM 205 for storing output data of the data separation section 204; a font ROM 206 for storing predetermined font data; a character generation section 207 for receiving the output data from the font RAM 205 and the output data from the font ROM 206, and outputting character signals; and a controllor 208 for controlling operations of the high frequency processing section 203, the font data separation section 204, the character generation section 207, the font RAM 205, and the font ROM 206.

The operation of the present invention constructed as above will be explained hereinafter.

First, when the disc 201 is inserted, the pickup 202 picks up a recording surface of the disc 201 including a predetermined area or predetermined areas on which the font data are recorded, and outputs the detected video management information to the high frequency processing section 203.

Then, when the high frequency processing section 203 processes the deteced signals of the pickup 202 and outputs video signals, the controller 208 determines whether font data are on the disc 201.

Here, information stored on the disc 201 is comprised of Video Managing Information(VMGI), Video Title Section (VTS#1-VTS#n) and font data, as shown in FIG. 3.

At this time, Video Managing Information (VMGI) has information concerning the existence, position and size of the recorded font data.

Accordingly, if font data are recorded on the disc 201, *the* controller 208 controls the servo (not shown) so as to move the pickup 202 to the position where the font data are recorded.

Then, when the pickup 202 plays back the font data recorded on the disc 201, the high frequency processing section 203 processes the reproduced font data and outputs video signals, and the data separation section 204 separates the font data from the output signals of the high frequency processing section 203 and stores the separated font data into the font RAM 205.

After this, when the storing of the recorded font data into the font RAM 205 is completed, the controller 208 controls the servo (not shown) so as to move the pickup 202 to the initial playback position.

Accordingly, when the pickup 202 detects data recorded on the disc 201, output signals of the high frequency processing section 203 which processes the detected data are signal-processed in a predetermined way to play back titles, and the controller 208 under playback determines whether input of the menu keys has been made.

At this time, when there has been input of menu keys, the controller 208 determines whether font data corresponding to the input are on the disc 201.

Accordingly, when corresponding font data are on the disc 201, the character generation section 207 controlled by the controller 208 reads data stored in the font RAM 205 and outputs character signals thereby displaying menu on a screen.

On the other hand, when corresponding font data are not recorded on the disc 201, the character generation section 207 controlled by controller 208 reads data stored in the font ROM 206 and outputs character signals thereby displaying menu on the screen.

Figure 4:
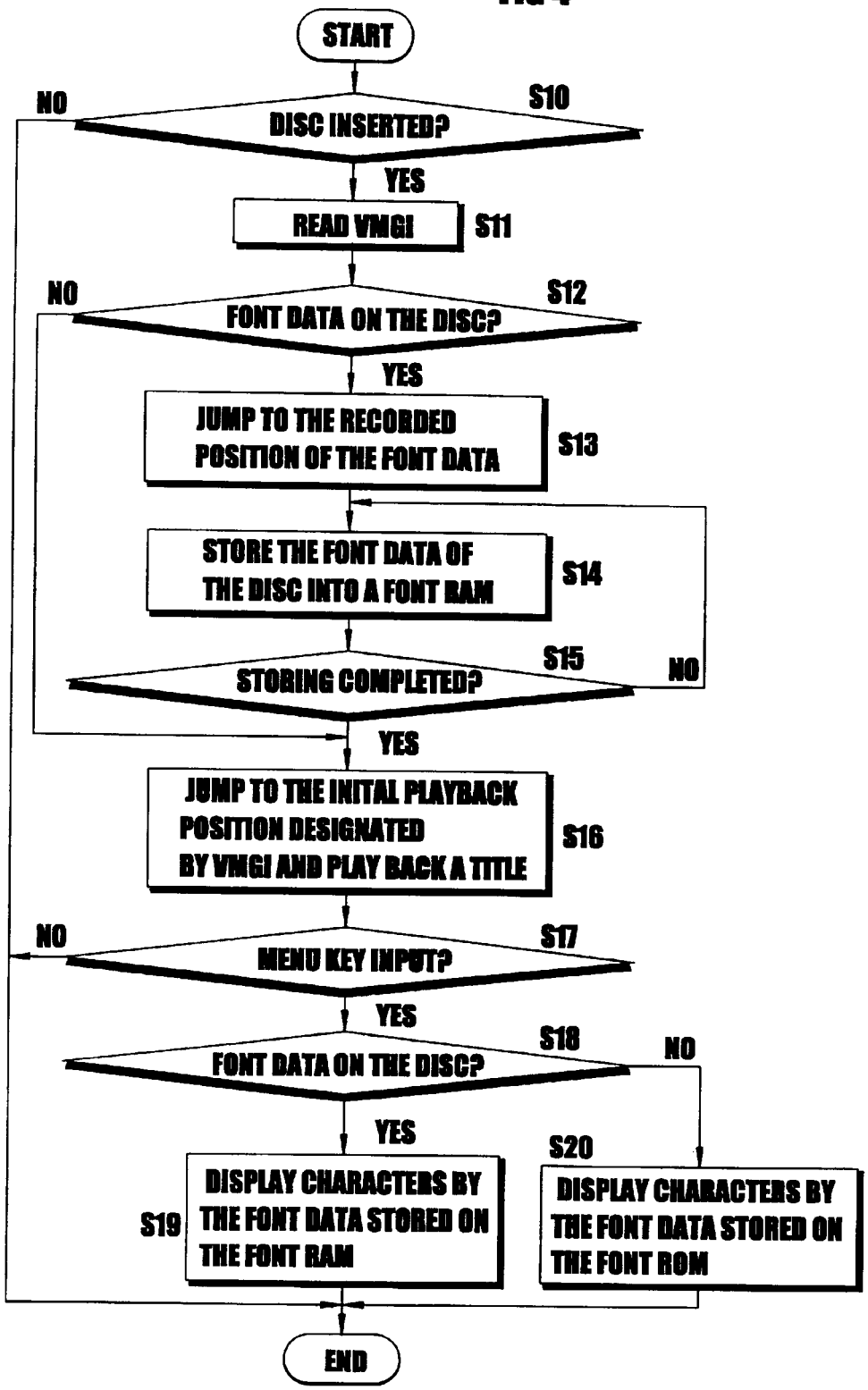
FIG. 4 is a flow chart showing the character display according to the present invention.

The above operation will be explained with reference to the flow chart shown in FIG. 4.

Namely, when the disc 201 is inserted at step S10, Video Managing Information (VMGI) recorded at certain area is read at step S12 and it is determined at step S11 whether font data are recorded on the disc 201.

Then, if font data are recorded on the disc 201, the pickup 202 is jumped to the position where the font data are recorded so as to detect the font data recorded on the disc 201 at step S13.

Accordingly, when the high frequency processing section 203 processes output signals of the pickup 202 and outputs video signals, the font data separation section 204 separates the font data from the output video signals and store the separated font data into the font RAM 205 at step S14.

Thereafter, when it is determined at step S12 that font data is not recorded on the disc 201, or the storing of the font data into the font RAM 205 is completed at step S15, the pickup 202 is moved to the initial playback position designated by Video Managing Information (VMGI), and plays back a title at step S16.

At this time, if input of the menu keys is made at step S17, it is determined at step S18 whether font data corresponding to the language selected by a user exist on the disc 201 so as to determine whether the font RAM 205 or the font ROM 206 is to be used as a source for the font data of the language selected by the user.

Accordingly, when the corresponding font data are on the disc 201 at step S18, the control flow goes to step S19, and then the character generation section 207 uses the font data stored on the font RAM 205 to output character signals thereby displaying subtitle in the selected language on a screen at step S19.

Otherwise, the control flow goes to step S20, and then the character generation section 207 uses the font data stored on the font ROM 206 to output character signals thereby displaying subtitle in the selected language on a screen at step S20.

According to the above embodiment of the present invention, it is provided that font data of at least some of the multi-languages to be used in multilingual subtitle processing, for example, rarely used font data are recorded (preformatted) on a disc, and then, stored into a font RAM, the font data of a language selected by a user are used from the font RAM thereby subtitle in the desired language (character) is being displayed on playback.

However, according to the present invention, it is also possible to record(format) font data corresponding to all languages on certain areas of a disc, to store the font data into a font RAM, to read the font of a language selected by a user from the font RAM and to display subtitle in the desired language (character). In this case, the font ROM 206 in FIG. 2 is not necessary.

As explained in detail above, the character display apparatus and method for a digital versatile disc (DVD) player according to the present invention record font data of at least some of multi-languages to be used in multilingual subtitle processing on certain area(s) of a disc, store the font data into a memory at initial stage of playback, read the stored font data corresponding to a language selected by selection input of a user and display character signals of the selected language for subtitle processing. Thus, the manufacturing cost can be reduced due to reduction of memory capacity requied and further DVDs can be maximum efficiently utilized.

As will be evident to those skilled in the art, various modifications of this invention can be made or followed in light of the foregoing disclosure without departing from the spirit of the disclosure or from the scope of the claims.

What is claimed is:

[1. A character display apparatus for an optical disc player, comprising:

a detection and separation unit to detect recorded data including a font data from said optical disc, and to separate said font data from the recorded data detected;

a memory to store the font data output from said detection and separation unit;

a character generation unit to generate character signals of characters of a selected language for a subtitle by using the font data stored in said memory; and a controller coupled to the character generation unit, to cause the character generation unit to generate character signals of a language for subtitle processing selected from multi-languages to be used in multilingual character subtitle processing on the basis of font data, at least some of which are recorded in the optical disc.]

[2. The character display apparatus according to claim 1, wherein said detection and separation unit comprises:

a pickup to detect the recorded data including said font data from said optical disc, and to output the recorded data detected as output signals;

a high frequency processing unit to process the output signals of said pickup, and to output video data signals; and a data separation unit to separate said font data from the output video data signals of said high frequency processing unit, and to output the separated font data, wherein said controller controls said high frequency processing unit, said data separation unit, said first memory and said character generation unit.]

[3. The character display apparatus according to claim 1, wherein said character display apparatus further comprises a second memory for storing font data of predetermined languages, and wherein said controller controls said character generation unit to output character signals of characters of the selected language for subtitle processing by using the font data of the selected language from said second memory if the font data of the selected language are not on said optical disc.]

[4. A character display method for an optical disc player, comprising:

detecting recorded data including a font data recorded in said optical disc, and outputting said recorded data detected as output signals;

processing the output signals, and outputting video signals;

separating said font data from the video signals, and outputting the font data separated;

storing the font data in a first memory; and outputting the character signals of a selected language for subtitle processing by using the font data stored in said first memory.]

[5. The character display method according to claim 4, wherein said player further comprises a second memory for storing font data of predetermined languages, and wherein said step of outputting the character signals of the selected language for subtitle processing includes outputting the character signals by using the font data of the selected language from said second memory if the font data of the selected language are not on said optical disc.]

[6. A character display method for an optical disc player, comprising:

determining whether font data of at least some of multi-languages to be used in multilingual subtitle processing are recorded in an optical disc;

storing the font data of at least some of the multi-languages in a first memory, if the font data of characters of languages for multilingual subtitle processing are stored in said optical disc; and outputting character signals of a selected language for subtitle processing according to the font data stored in said first memory when one of said multi-languages is selected, and outputting the character signals by using the font data of the selected language from a second memory if the font data of the selected language are not recorded in said disc.]

[7. A character display apparatus for an optical disc player, comprising:

a data separator to separate font data to be used in multilingual subtitle processing from a predetermined area of an optical disc;

a first memory to store the separated font data;

a second memory to store predetermined font data to be used in multilingual subtitle processing;

a character generator to generate character signals of a language for the subtitle processing from stored font data; and a controller to cause the character generator to generate character signals from the font data stored in the first or second memory, based on a selected language, thereby outputting character signals of a language for subtitle processing selected from multi-languages to be used in multilingual character subtitle processing on the basis of font data, at least some of which are recorded in the optical disc.]

[8. The character display apparatus according to claim 7, wherein the first memory is a random access memory and the second memory is a read only memory.]

[9. A character display method for an optical disc player, comprising:

selecting a language for subtitle processing from multi-languages;

separating font data from other data read from a disc;

storing the separated font data in a first memory; and generating character signals from the stored font data or from predetermined font data stored in a second memory, thereby outputting character signals of a language for subtitle processing selected from multi-languages to be used in multilingual character subtitle processing on the basis of font data, at least some of which are recorded in the optical disc.]

[10. The character display apparatus according to claim 9, wherein said generating step includes generating the character signals from the predetermined font data if the selected language does not correspond to the stored font data in the first memory.]

[11. A system for generating character signals for a language of a subtitle recorded in an optical disc, said optical disc including at least a predetermined area on which a font data for generating character signals to be used in multilingual subtitle processing are located, comprising:

an optical pickup to read recorded data including the font data to be used in multilingual subtitle processing;

a data processor to process the font data read from the optical pickup;

a first memory to store the font data;

a second memory to store predetermined font data to be used in multilingual subtitle processing;

a character generator to generate character signals of a language for the subtitle processing from stored font data; and a controller to cause the character generator to generate character signals from the font data stored in the first or second memory, based on a selected language, thereby outputting character signals of a language for subtitle processing selected from multi-languages to be used in multilingual character subtitle processing on the basis of font data, at least some of which are recorded in the optical disc.]

*12. A method of controlling a character displaying device, the method comprising:*

*receiving into the character displaying device a first font data from a source;*

*storing, in a first memory area, the received first font data;*

*receiving a user input indicating a selection of the first font data or second font data stored in a second memory and that is separate than the first font data;*

*selectively generating, via a character generating unit, character data to have a font defined by the first font data stored in the first memory area when the user input indicates the selection of the first font data and to have a font defined by the second font data stored in the second memory area when the user input indicates the selection of the second font data; and*

*displaying the generated character data,*

*wherein the first and second font data are independent of the character data and are selectively applied to the character data to generate the character data to have a specific style of type within a font type family defined by the first or second font based on the user input.*

*13. The method of claim 12, wherein the second font data is pre-stored before the first font data.*

*14. The method of claim 13, wherein the receiving step is performed by a digital device, and the pre-stored second font data is resident on the digital device.*

*15. The method of claim 12, wherein the displaying step displays a menu including the generated character data on a screen.*

*16. The method of claim 12, wherein the step of receiving comprises:*

*receiving a removable encoded media containing the data into a media reading unit of the character displaying device, and reading the removable encoded media.*

*17. The method of claim 16, wherein the encoded media is a DVD.*

*18. The method of claim 12, wherein the first and second memory areas correspond to separate memories or correspond to separate memory areas in a single memory.*

*19. The method of claim 12, wherein one of the first font data stored in the first memory area and the second font data stored in the second memory area is removable and another one is not.*

*20. The method of claim 12, wherein at least one of the first and second font data is used for a subtitle of a video data.*

*21. The method of claim 12, wherein the first and second font data is used for different languages respectively.*

*22. The method of claim 12, wherein the character data within a same character language is applied with the first or second font to generate the character data within the same language to have the specific style of type within the font type*

*family defined by the first or second font without changing the language of the character data.*

*23. A character displaying device, comprising:*

*a receiver configured to receive a first font data from a source;*

*a first memory area configured to store the received first font data;*

*a second memory area configured to store a second font data that is separate than the first font data stored in the first memory area;*

*an input unit configured to receive a user input indicating a selection of the first font data or second font data;*

*a character generating unit configured to selectively generate character data to have a font defined by the first font data stored in the first memory area when the user input indicates the selection of the first font data and to have a font defined by the second font data stored in the second memory area when the user input indicates the selection of the first font data; and*

*a display configured to display the generated character data,*

*wherein the first and second font data are independent of the character data and are selectively applied to the character data to generate the character data to have a specific style of type within a font type family defined by the first or second font based on the user input.*

*24. The device of claim 15, wherein said receiver comprises:*

*a media reading unit configured to accept and read a removable encoded media containing the data.*

*25. The device of claim 24, wherein the encoded media is a DVD.*

*26. The device of claim 23, wherein the second font data is pre-stored before the receiver receives the first font data.*

*27. The device of claim 23, wherein the first and second memory areas correspond to separate memories or correspond to separate memory areas in a single memory.*

*28. The device of claim 23, wherein one of the first font data stored in the first memory area and the second font data stored in the second memory area is removable but another one is not.*

*29. The device of claim 23, wherein at least one of the first and second font data is used for a subtitle of a video data.*

*30. The device of claim 23, wherein the first and second font data is used for different languages respectively.*

*31. The device of claim 23, wherein the character data within a same character language is applied with the first or second font to generate the character data within the same language to have the specific style of type within the font type family defined by the first or second font without changing the language of the character data.*

* * * * *